US006994010B2

(12) United States Patent
Hild

(10) Patent No.: US 6,994,010 B2
(45) Date of Patent: Feb. 7, 2006

(54) CUTTING TOOL FOR A PUNCHING MACHINE, METHOD FOR PRODUCING SAID CUTTING TOOL AND PUNCHING MACHINE

(75) Inventor: Horst Hild, Mainhausen (DE)

(73) Assignee: Peach Office Products Ltd., Zurich (CH)

( * ) Notice: Subject to any disclaimer, the term of this patent is extended or adjusted under 35 U.S.C. 154(b) by 104 days.

(21) Appl. No.: 10/343,301

(22) PCT Filed: Aug. 13, 2001

(86) PCT No.: PCT/CH01/00495

§ 371 (c)(1),
(2), (4) Date: Jan. 29, 2003

(87) PCT Pub. No.: WO02/14034

PCT Pub. Date: Feb. 21, 2002

(65) Prior Publication Data

US 2003/0172784 A1    Sep. 18, 2003

(30) Foreign Application Priority Data

Aug. 14, 2000  (CH) ..................................... 1576/00

(51) Int. Cl.
*B42B 9/00*    (2006.01)
*B42B 5/00*    (2006.01)
*B26D 5/10*    (2006.01)
*B26F 1/14*    (2006.01)

(52) U.S. Cl. ........................... 83/691; 83/697; 83/620; 83/633; 83/605; 412/16; 412/38; 412/42

(58) Field of Classification Search .......... 83/687–689, 83/691, 695, 697, 660, 618, 620, 624, 626, 83/630, 633, 588, 589, 599, 604, 605, 167, 83/670, 571; 281/21.1; 412/38–42, 1, 16, 412/33, 43; 76/101.1, 116, 107.1; 234/38, 234/40, 43, 44; 30/346.54, 348, 350, 353; 270/52.17, 58.07
See application file for complete search history.

(56) References Cited

U.S. PATENT DOCUMENTS 2,195,846 A * 4/1940 Balder ......................... 30/155
3,170,358 A * 2/1965 Martin ......................... 83/673
3,222,785 A * 12/1965 Bastis .......................... 30/355

(Continued)

FOREIGN PATENT DOCUMENTS

DE           29923239 U1    7/2000

(Continued)

*Primary Examiner*—Boyer D. Ashley
(74) *Attorney, Agent, or Firm*—Tarolli, Sundheim, Covell & Tummino L.L.P.

(57) ABSTRACT

A cutting tool (1) for a punching machine has a punching body (8) on which a plurality of punching tool elements (5) which are located parallel to each other are provided. The puncing body (8) consists of a double-layered metal sheet (2, 12). Essentially longitudinal openings (7) are advantageously punched out of a sheet metal plate (2 and 12) symmetrically about an axis (6), these longitudinal openings (7) being situated parallel to each other, respectively. The sheet metal plate (2, 12) is then folded about the axis (6) in order to form the double-layered punching tool elements (5). This allows the use of more simple punching machines and enables a punching machine to be produced from just a few individual parts.

5 Claims, 4 Drawing Sheets

U.S. PATENT DOCUMENTS

| | | |
|---|---|---|
| 3,255,949 A | 6/1966 | Buttery |
| 3,463,039 A * | 8/1969 | Silver .......................... 83/139 |
| 3,967,336 A * | 7/1976 | Cutter .......................... 412/13 |
| 4,358,893 A * | 11/1982 | Stanfield ...................... 30/280 |
| 4,706,533 A | 11/1987 | Giulie |
| 4,951,967 A | 8/1990 | Michalik |
| 5,524,930 A * | 6/1996 | Foster et al. ............... 281/21.1 |
| 5,768,969 A * | 6/1998 | Dalfiume .................... 83/660 |
| 2004/0115031 A1* | 6/2004 | Horst .......................... 412/38 |

FOREIGN PATENT DOCUMENTS

| | | |
|---|---|---|
| EP | 0958902 A2 | 11/1999 |
| EP | 0958902 A3 | 11/1999 |
| FR | 2693403 A1 | 1/1994 |
| JP | 49103878 | 10/1974 |
| WO | WO9324289 A1 | 12/1993 |
| WO | WO0214034 A2 | 2/2002 |
| WO | WO0214034 A3 | 2/2002 |

* cited by examiner

US 6,994,010 B2

CUTTING TOOL FOR A PUNCHING MACHINE, METHOD FOR PRODUCING SAID CUTTING TOOL AND PUNCHING MACHINE

FIELD OF THE INVENTION

The invention relates to a cutting blade for a punching machine, having a punching body on which a multiplicity of punching blade elements arranged parallel to one another are provided.

BACKGROUND OF THE INVENTION

Such a punching blade has been disclosed by WO 93/24289. In this case, the lengths of the punching elements are provided in groups of different length, so that in each case only a restricted number of punching elements have to pass simultaneously through a document to be punched, as a rule a number of sheets.

These punching blades work satisfactorily. However, their high price is disadvantageous, since the requisite punching thicknesses of, for example, 3 millimeters require machines which have a fine-punching mechanism and which have to be able to produce a pressure force of, for example, 800 tonnes. This is a price-raising factor for the punching machines to be used during the production.

A further disadvantage of the punching machine according to the prior art lies in the multiplicity of parts of a punching machine using such a punching blade, in which case, in particular, it is also always necessary to additionally provide a rake.

BRIEF SUMMARY OF THE INVENTION

Based on this prior art, the object of the invention is to specify a punching blade of the type mentioned at the beginning which can be produced in a considerably more cost-effective manner and in addition can be used in a machine consisting of few parts.

This object is achieved according to the invention in that the punching body consists of a double-layered metal sheet.

A method of producing the punching blade comprises the features of punching out essentially elongated openings symmetrically about an axis from a sheet-metal plate, the elongated openings in each case being arranged parallel to one another, and of folding the sheet-metal plate about said axis.

In an advantageous method of producing a punching blade, the step of cutting off sections at the folding line for producing a desired cutting contour is added.

An advantageous punching device having a punching blade according to the invention then has merely four parts, in which case these are all produced from metal sheet which is at most only 1.5 millimeters thick.

BRIEF DESCRIPTION OF THE DRAWINGS

The invention will now be described in more detail with reference to the attached exemplary embodiments. In the drawings.

DETAILED DESCRIPTION OF THE INVENTION

Figure 1:
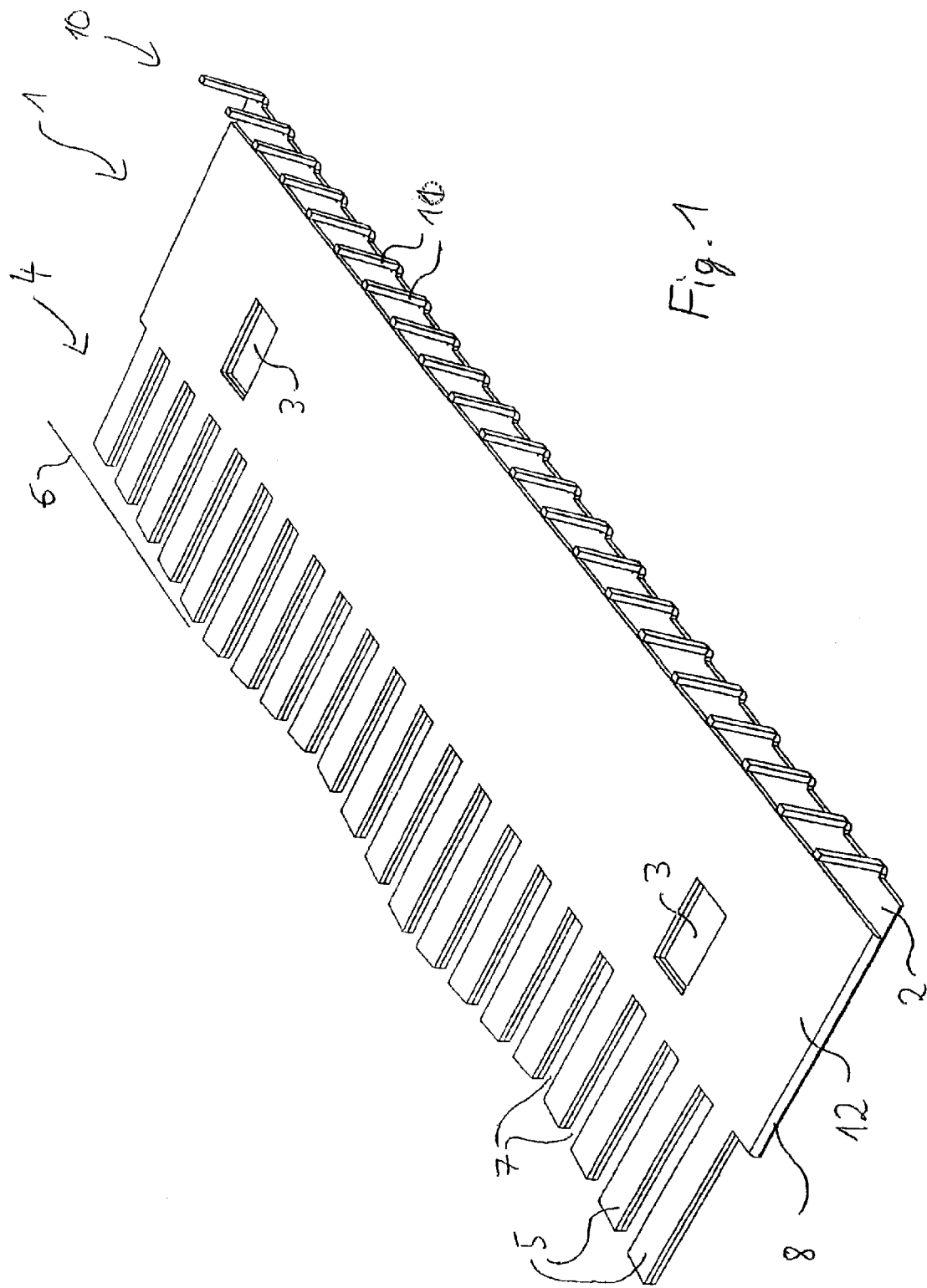
FIG. 1 shows a punching blade according to the invention.

FIG. 1 shows the punching blade 1 according to the invention. This punching blade 1 consists of a bottom sheet-metal plate 2 and a top sheet-metal plate 12 which lie essentially congruently above one another. Two apertures 3 are punched in these plates 2 and 12, said apertures 3 being intended for the subsequent movement of the punching blade 1. A multiplicity of parallel punching blade elements 5 are shown in the punching blade region 4, the punching blade elements 5 in each case being cut off in a wavelike manner relative to an axis 6, so that all the punching blade elements 5 do not in each case pass simultaneously through paper to be punched. The punching blade elements 5 are otherwise elongated in cross section and are in particular rectangular. Thus U-shaped punching recesses 7 are arranged between each two punching blade elements 5. In other configurations, the punching blade elements 5 and punching recesses 7 may be constructed with side edges which are not parallel to one another; the punching blade elements 5 then taper toward the punching body 8 and/or are curved. Provided on that end of the punching body 8 which is opposite the punching blade elements 5 is a comb 10 having a multiplicity of teeth 11, which each project at right angles from the plate 8. The distance between the teeth 11 corresponds to the distance between the punching blade elements 5. The teeth 11 have preferably been punched out of the bottom base sheet 2 and then bent upward by an angle of 90°. Of course, the teeth 11 may also be punched out of the top base sheet 12.

The advantage of the punching blade 1 according to the invention lies in particular in the fact that the intermediate spaces 7 between the punching blade elements 5 are punched out with the metal sheet "unfolded"; i.e., in the exemplary embodiment according to FIG. 1, rectangular elongated punched-out portions have been produced symmetrically to the axis 6 of the original metal sheet. In the process, the rake 10 with the teeth 11 can be punched out in the same working step. At a thickness of 1.5 millimeters, conventional punching tools of 300 tonnes capacity can be used. Thus there are no costs involved with regard to complex punching tools, which is to be used in the case of sheet thicknesses of 3 millimeters.

It is advantageous to use a galvanized sheet, since, during the cutting, the zinc coating is pulled down with the cutting blade at the cut-off side edges and these cutting edges are thus sealed. This sealing is retained when the two sheet-metal layers 2 and 12 are placed one on top of the other by folding.

Figure 2:
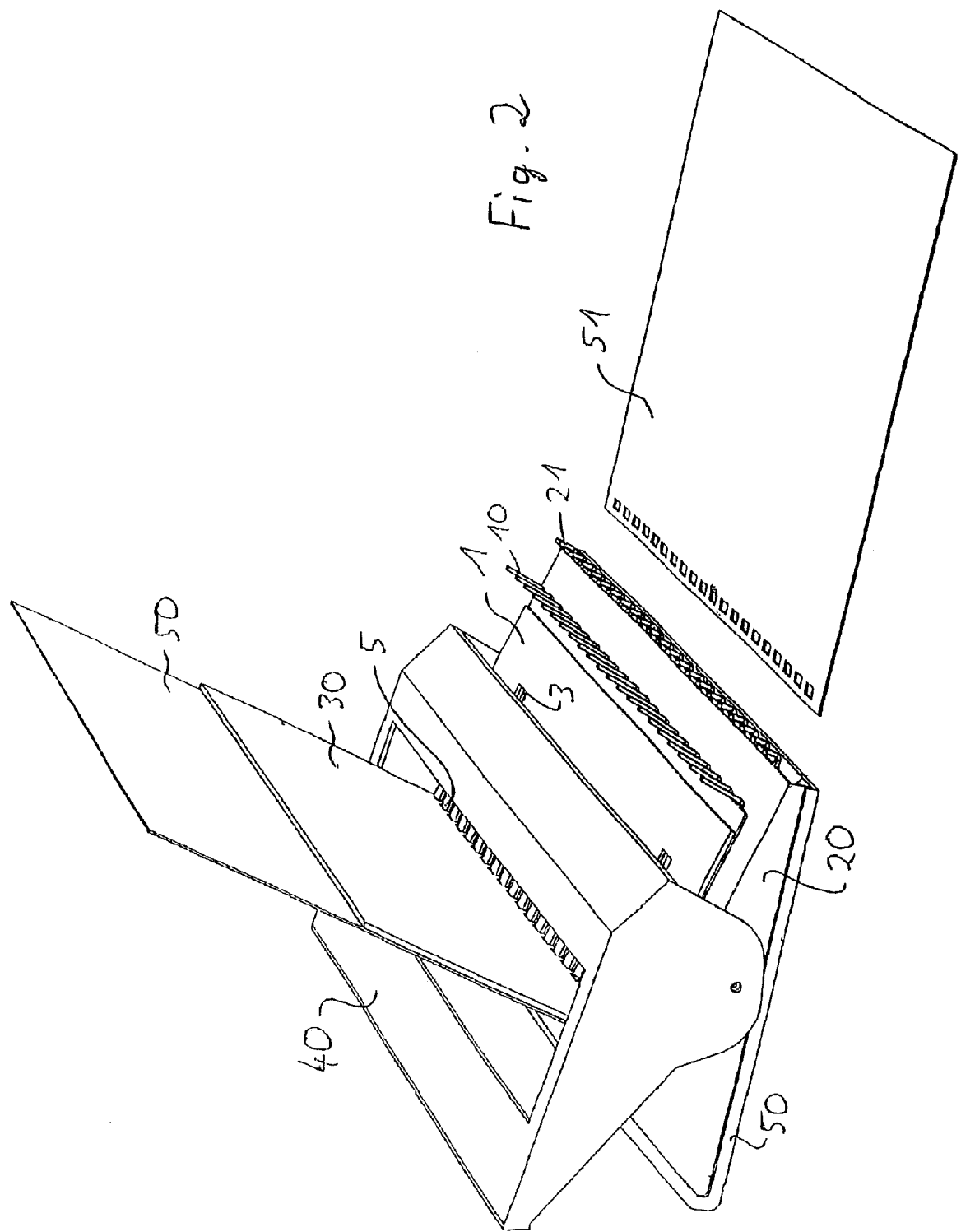
FIG. 2 shows a punching machine with a punching blade according to FIG. 1 and a punched product.

FIG. 2 shows a punching machine in which the punching blade 1 according to FIG. 1 may be advantageously used. The punching blade 1 with the rake 10 rests on the base body 20, which is of trapezoidal design. At its narrowed end, the base body 20 has a comb 21 which has teeth which interact with the teeth 11 of the rake 10. A paper support with integrated stripper and blade guide is designated by 30 and can better be seen in FIG. 3. Finally, a single lever 40 is provided which at the same time forms the drive for the punching and binding. Provided on the lever 40 are control pins which engage in the aperture 3 of the punching blade 1, and thus this punching blade 1 with the punching blade elements 5, for the punching, is driven through the paper support 30 and through the paper 50. At the same time, it is thus possible for paper 51 which has already been punched to be bound with binder backs inserted between rake 10 and comb 21. Thus a very simple machine is constructed in a very advantageous manner, and this machine only consists of four individual parts, the punching blade 1, the base body 20, the paper support and the blade guide 30, and the lever 40. Advantageously fastened beneath the body 20 is a scrap container 52, i.e. a base which catches the paper residues falling into the interior space of the base frame 20. The four bodies may be made of sheet metal and in particular of the same sheet metal material, but base body 20 or blade guide 30 or lever 40 may be made of plastic and in particular by injection molding.

Figure 3:
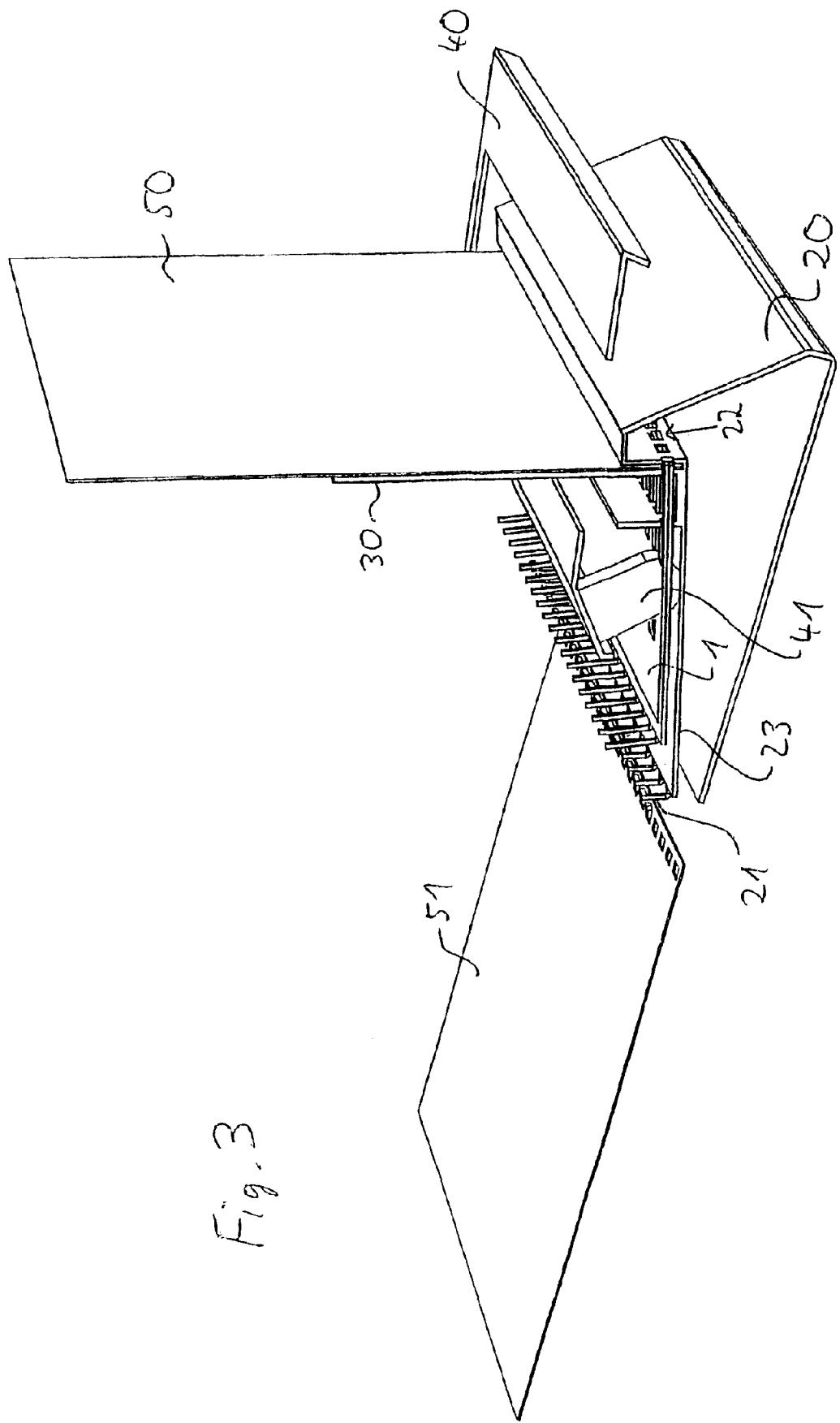
FIG. 3 shows a partly sectioned perspective view of the machine according to FIG. 2.

Finally, FIG. 3 shows a partly sectioned view of the punching machine according to FIG. 2. The same features are in each case provided with the same reference numerals. The trapezoidal base frame 20 with die 22, through which the punching blade elements 5 pass, can be seen. The engagement element 41 with which the punching blade 1 can be moved on the surface 23 of the base frame 20 relative to the comb 21 can be seen on the lever 40.

The paper support 30 is, for example, U-shaped and has two rows of holes which interact with the die 22. In this case, the paper support 30 at the same time forms the integrated stripper and a blade guide.

The parts in each case advantageously consist of galvanized sheet and are therefore very simple to process. Simple punching tools can be used due to the small sheet thickness of only 1.5 millimeters. In order to achieve the thickness of the punching blade elements 5 of, for example, 3 millimeters, which is required for forming the holes, the punching blade 1 is produced by folding a pre-punched metal sheet and is merely reworked after the folding.

Figure 4:
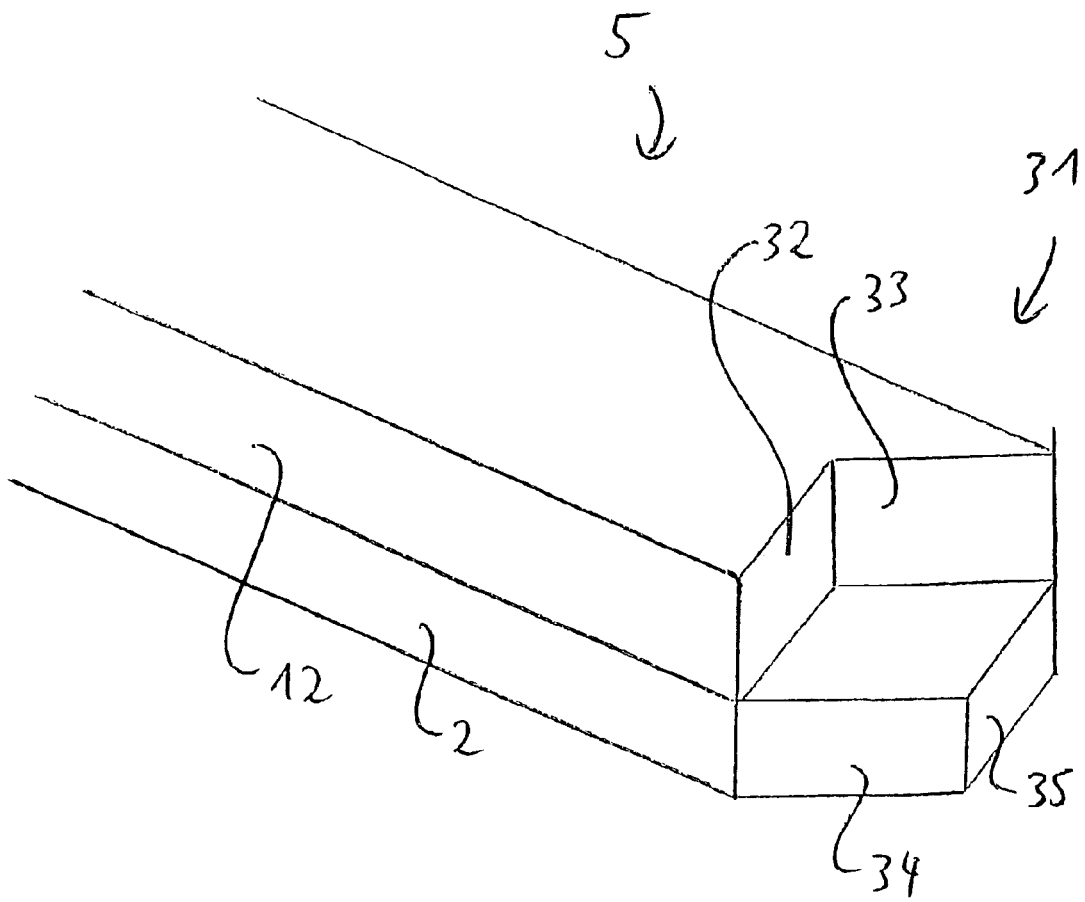
FIG. 4 shows the tip of a punching element in a punching blade according to an exemplary embodiment of the invention.

FIG. 4 shows an advantageous exemplary embodiment of the tip of a punching blade 5. The latter, as in FIG. 1, consists of two layers 2, 12 of a metal sheet, the latter, before it has been folded, having also been provided with a punched contour in the tip region 31 of each punching blade 5. In the exemplary embodiment shown in FIG. 4, this involves two sides 32 and 33 or 34 and 35, respectively, of an isosceles triangle, the third side being parallel to the axis 6 and forming the folding axis. Thus it is possible in a very simple manner, in particular with the same punching step, to produce a three-dimensional cutting edge. This permits smaller cutting forces when each punching blade 5 passes through the material to be perforated. In addition, the specification of a contour in accordance with the punching blade 5 according to FIG. 1 is also possible, but is not a requirement.

What is claimed is:

1. A cutting blade (1) for a punching machine, the cutting blade (1) having a punching body (8) with a plurality of punching blade elements (5) arranged parallel to one another, the punching body (8) comprising two sheet metal layers (2, 12),
   the punching body (1) having elongated openings (7), the elongated openings (7) being symmetric about an axis (6) extending from the two sheet metal layers (2, 12), the elongated openings (7) being arranged parallel to one another,
   the sheet metal layers (2, 12) being folded about the axis (6) thereby forming double-layered punching blade elements (5), at the same time as or nearly at the same time as punching-out of the elongated openings (7), a toothed comb (11) being punched out on one of two plate ends, the toothed comb (11) being bent essentially 90 degrees at the same time as or nearly at the same time as folding of the sheet metal layers (2, 12).

2. The cutting blade as claimed in claim 1, characterized in that, before the folding of the sheet-metal plate (2, 12), tips (31) of the punching blade elements (5) to be punched, at the same time as or just before the punching step, are punched with a contour (32, 33; 34, 35), so that each punching blade element (5) is given a three-dimensional cutting contour.

3. A cutting blade (1) for a punching machine, the cutting blade (1) having a punching body (8) with a plurality of punching blade elements (5) arranged parallel to one another, the punching body (8) comprising two sheet metal layers (2, 12), one of the two sheetmetal layers (2, 12), opposite the punching blade elements (5), having a rake (10) for expanding a binder back, the rake (10) being oriented at a right angle to the two sheet metal layers (2, 12).

4. A punching machine having a punching blade (1) as claimed in claim 3, characterized in that the punching blade (1) rests on a base frame (20) in a displaceable manner, the base frame (20) having a comb (21) interacting with the rake (10), the punching blade (1) being displaced by means of a lever (40), the lever (40) directing the punching blade elements (5) simultaneously against a paper holder (30) and through a loadable material (51) to be punched and a die (22) provided in the base frame (20).

5. The punching machine as claimed in claim 4, characterized in that the base frame (20), the lever (40), the paper holder (30) and the punching blade (1) are produced from metal sheet, the metal sheet having at most a 1.5 millimeter thickness.

* * * * *